Aug. 28, 1923.

M. A. ERICKSON 1,466,358

HEADLIGHT LENS

Filed June 11, 1921

INVENTOR
Marcus A. Erickson
BY Merchant, Kilgore & Kilgore
His ATTORNEYS

Patented Aug. 28, 1923.

1,466,358

UNITED STATES PATENT OFFICE.

MARCUS A. ERICKSON, OF ST. CLOUD, MINNESOTA, ASSIGNOR OF ONE-HALF TO CHARLES E. BIRD, OF MINNEAPOLIS, MINNESOTA.

HEADLIGHT LENS.

Application filed June 11, 1921. Serial No. 476,719.

*To all whom it may concern:*

Be it known that I, MARCUS A. ERICKSON, a citizen of the United States, residing at St. Cloud, in the county of Stearns and State of Minnesota, have invented certain new and useful Improvements in Headlight Lenses; and I do hereby declare the following to be a full, clear, and exact description of the invention, such as will enable others skilled in the art to which it appertains to make and use the same.

My invention relates to headlight lenses for automobiles and other road vehicles, and has for its object to provide in such lenses means for better distribution of the light on the road and above the road without producing blinding effects in the eyes of persons in approaching machines.

It is a well known fact that good road illumination requires that the major portion of the light be projected onto the road bed ahead of the machine and that a minor portion of the light be projected above the machine so as to illuminate overhead objects, such as low branches of trees and the like, that may be encountered along the roadway.

The laws of most municipalities and of some States require that blinding rays of light be cut out of a certain zone where they would produce blinding effect in the eyes of a driver or person in an approaching machine. My invention accomplishes the desired result in a satisfactory manner simply by the deflection, chiefly downward but partly upward, of the light rays, in such manner that there is a relatively dark zone on lines that reach the eyes of persons in approaching machines. This prevents blinding effects without the loss of any of the light rays of the beam, gives good road illumination and ample overhead illumination.

A preferred form of the lens designed to accomplish the above result, generally, and certain other minor but important results, is illustrated in the accompanying drawings, wherein like characters indicate like parts throughout the several views.

Referring to the drawings.

Figure 1:
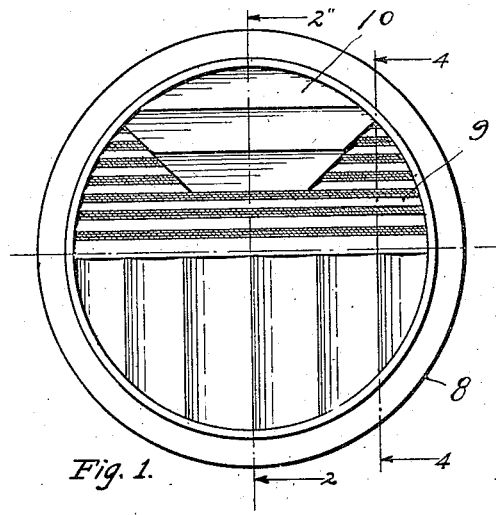
Fig. 1 is a front elevation showing a headlight, such as used on automobiles, equipped with a lens designed in accordance with my invention.
Figure 2:
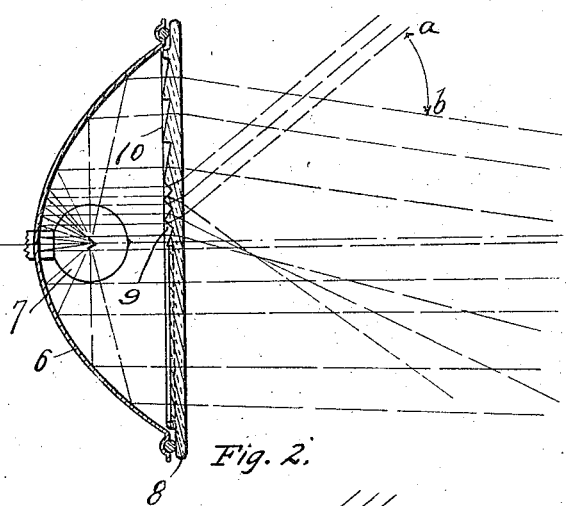
Figs. 2 and 3 are vertical sections taken on the line 2—2 of Fig. 1.
Figure 3:
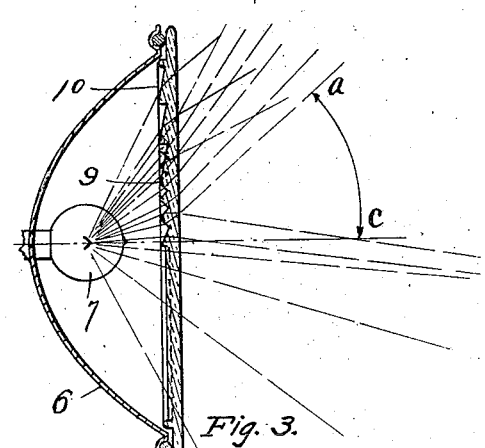
Figure 4:
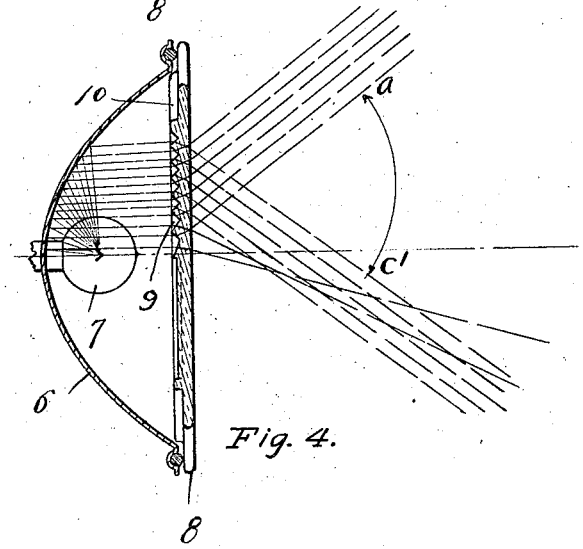
Figure 5:
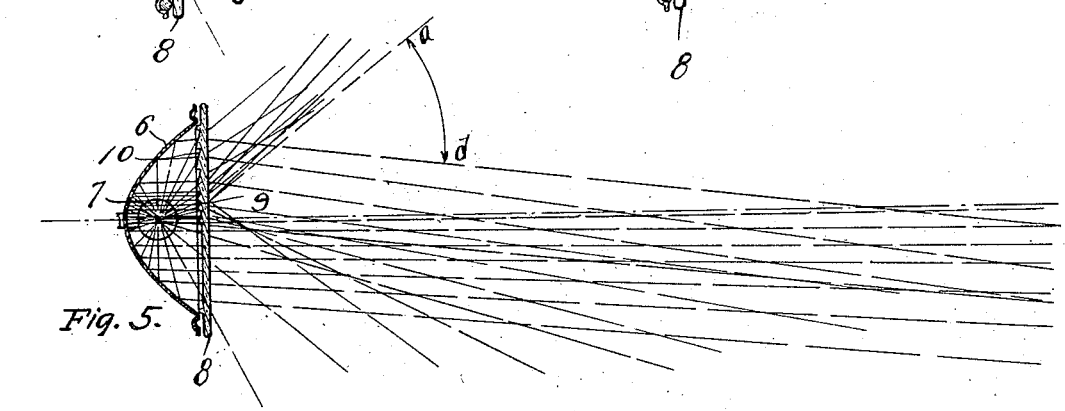

Fig. 4 is a vertical section through the lens on the line 4—4 of Fig. 1, the other parts of the headlight being sectioned on the same line as Figs. 2 and 3; and Fig. 5 is a section on the same line as Figs. 2 and 3, but showing the parts on a smaller scale.

In the drawings, the headlight casing is not shown, but the reflector is indicated by the numeral 6 and the light bulb by the numeral 7. This reflector may be of any suitable design but preferably and as shown, is a parabolic reflector. The lens 8 may be secured to the reflector by the customary or any suitable means, not illustrated.

The upper half of the lens is formed with horizontally extended prismatic portions or ribs 9 and 10, bisymmetrical on opposite sides of a vertical line drawn through the center of the lens. The prisms 10 are within a quadrant or segment of approximately ninety degrees, and extend at approximately forty-five degrees on each side of a vertical line intercepting the center of the lens, while the prisms 9 extend over the remaining part of the upper half of the lens and cut off the inner apex of the angle or quadrant in which the prisms 10 are located. Otherwise stated, the quadrant or segment, in which the prisms 10 are located, is truncated and the prisms 9, immediately above the horizontal axis of the lens, extend in quite a band from one side to the other of the lens.

Fig. 2 illustrates the lines on which reflected rays are projected and deflected, in a vertical plane at the vertical axis of the lens, while Fig. 3 shows lines on which the direct rays are projected and deflected. By reference to Fig. 2, it will be noted that the prisms 10 are so inclined and formed that the reflected rays passing therethrough will be deflected downwardly and below horizontal lines, while reflected rays passing through the prisms 9 will be deflected in part downward materially below a horizontal line, and in part upwardly far above horizontal lines.

It will now be noted that, so far as reflected rays are concerned, there is a zone *a—b*, Fig. 2 into which no rays of light are projected.

By referring now to Fig. 3, it will be noted that direct rays passing through prisms 10 will be given a slight downward deflection, but will be projected high above horizontal lines, while the direct rays passing through the prisms 9 will mostly be deflected high above horizontal lines, while some thereof will be deflected downward very considerably below horizontal lines. This leaves a zone a—c, Fig. 1, into which no direct rays will be projected.

Fig. 4 shows the upward and downward deflection or spreading of the light rays in the vertical plane of section line 4—4, Fig. 1, and by reference to this view, Fig. 4, it will be noted that these upwardly and downwardly deflected rays leave a large dark zone a—c'.

Fig. 5 is a sort of a composite diagram view showing both direct and reflected rays illustrating the manner in which they are deflected. By reference to this view, Fig. 5, it will be noted that some of the reflected rays cross so that the zones a—c and a—c' are not distinctly marked, but nevertheless, that there is a zone a—d into which no rays, either direct or reflected, are projected. This zone a—d is nearly co-extensive with the zone a—b and it is in such position in front of the headlight that it produces a non-blinding field or zone in the eyes of persons in approaching machines. Theoretically, this non-blinding zone would be dark, but, in fact, it will not be distinctly dark, but will be slightly illuminated by defused light, and this is an advantage rather than a disadvantage. The important facts are that, within this zone, there are no blinding rays and that this is accomplished simply by deflecting or turning the blinding rays out of their natural line of projection onto the road bed or elsewhere where the best possible illumination is desired.

The lower half of the lens may be designed in various different ways, but preferably, it is made of fluted or wave-like form affording prismatic surfaces that spread the lower part of the light beam in both directions transversely of the road.

The above statements as to the character of the surface of the lens refer to the operative portion thereof, but the lens is preferably formed with a smooth marginal flange adapting it to be more readily fitted to the reflector and clamped in position.

In some instances, it may be desirable to sand-blast, grind or otherwise treat the under or lower bevels of the prisms 9, so that they dim or defuse somewhat the upwardly deflected light rays. This would be required only where a very limited overhead illumination was desired.

What I claim is:

1. A headlight lens formed in its central upper quadrant with horizontal prismatic surfaces constructed and arranged to downwardly deflect light rays passed therethrough, the remaining portion of the upper half of said lens having horizontal outwardly converging prismatic surfaces beveled upwardly and downwardly in reverse directions and acting to deflect part of the light rays downwardly and part of the light rays upwardly, said deflected rays leaving a dark or unblinding zone.

2. A headlight lens formed in its central upper quadrant with horizontal prismatic surfaces that terminate above the center of the lens and extend equi-distant on opposite sides of the vertical axis of the lens, said prismatic surfaces being constructed to downwardly deflect light rays passed therethrough, the remaining portion of the upper half of said lens having horizontal corrugations beveled in both directions and acting to deflect part of the light rays downwardly and part of the light rays upwardly, said deflected rays leaving a dark or non-blinding zone.

3. The combination with a reflector and a light source therein, of a lens applied to said reflector, said lens having its central upper quadrant formed with transverse prismatic surfaces that deflect reflected rays below a horizontal, said central quadrant being equi-distant on opposite sides of the vertical axis of the lens and being truncated and terminated above the center of the lens, the remaining part of the upper half of said lens being formed with horizontal prismatic surfaces that converge outwardly and are upwardly and downwardly beveled in reverse directions so that they deflect part of the light rays downwardly below and part above the horizontal, leaving above the horizontal axis of the reflector a dark non-blinding zone into which no light rays are projected.

In testimony whereof I affix my signature.

MARCUS A. ERICKSON.